3,005,792

PROCESS OF PRODUCING RESINOUS UREA-BIURET - FORMALDEHYDE CONDENSATE AND PRODUCT PRODUCED THEREBY

Louis E. Craig and John T. Minor, Pryor, Okla., assignors, by mesne assignments, to Deere & Company, a corporation of Delaware
No Drawing. Filed Jan. 30, 1958, Ser. No. 712,075
6 Claims. (Cl. 260—29.4)

This invention relates to novel resinous compositions. More particularly, it relates to resinous compositions which are composed, essentially, of the reaction products resulting from the condensation of urea, biuret and formaldehyde.

The novel products of our invention are characterized by their ability to polymerize and thereby form insoluble resins having outstanding resistance to the softening and penetrating effect of water, and by their pronounced and unexpectedly effective adhesive properties. Because of these unusual attributes our resinous compositions are particularly useful as laminating adhesives in the production of outstanding strong and stable laminates of paper, wood and the like.

We are aware that the production of various kinds of resinous compositions from urea and formaldehyde is well known. However, such compositions do not have the adhesive and water resistant properties which are the ultimate desiderata in the art of plywood or laminated paperboard manufacture, for example, and there is still great need for what are known in the art as laminating resins whose use would result in stronger and more resistant laminates of this type, which are cheap and easy to use, and derived from readily obtained raw materials.

Accordingly, one of the primary objects of our invention is to provide such a novel resinous composition. A further object is to produce resinous compositions having outstanding adhesive properties and water resistance when used as laminating resins. Another object is to provide economical means for the production of such resinous compositions. Other objects will be apparent as the description of our invention proceeds hereinafter.

In pursuit of these objects, we have discovered that resinous compositions having those desired attributes can be produced by condensing certain mixtures of urea and biuret, namely those in which the biuret is present in an amount which is equivalent to from about 2 to 30% by weight of the mixture, with formaldehyde in aqueous solution. For best results the molar ratio of formaldehyde to the reactive amide nitrogen groups

is desirably in the range of about 1.5:1 to 2.4:1 and preferably about 2:1. The aqueous solution of urea, biuret and formaldehyde, in the ratios above given, is heated in the presence of a condensation catalyst, including alkaline materials such as sodium carbonate, sodium hydroxide and the like, and with or without the addition of a small amount of ammonia as desired, at reflux temperature for about 1 to 5 hours, and preferably about 2 hours, to effect condensation of the reactants.

The pH of the resulting solution can be then adjusted to a pH of about 7.3–7.5 by using any suitable acid or base, such as acetic acid, sodium carbonate or the like. The resulting solution may be and preferably is, reduced in volume, most conveniently in vacuo, with the temperature preferably being held at about 40° C. or below, to reach whatever solids content may be desired.

Suitable polymerization catalysts for use in curing the resinous condensation product are those represented by ammonium chloride, sodium chloroacetate, acetic acid, phthalic anhydride, bromohydrocinnamic acid, B-chloroethylurea, phthalamide esters, phosphoric acid, salts of phosphoric and of sulfonic acids, ammonium sulfamate and the like, in amounts from about 0.1 to 1.0% based on the condensation product. Other curing agents with preferred amounts specified, (based on the condensation product) which can be used are hydrochloric acid, 0.1–0.2%; citric acid, 0.1–1.0%; oxalic acid, 0.1%; sodium acid phthalate, 0.1–1.0%; chloroacetamide, 0.5–1.0%.

In carrying out the above described condensation of urea, biuret and formaldehyde any of the well known basic condensation catalysts can be used, including by way of illustration not only sodium carbonate and sodium hydroxide, but also potassium hydroxide, potassium carbonate, calcium hydroxide, barium hydroxide and other alkali metal and alkaline earth bases. Other catalysts are represented by basic tertiary amines, and quaternary ammonium hydroxides, including for example, pyridines, trialkylamines and trialkylammonium hydroxides such as benzyltrimethylammonium hydroxides. Most desirably the condensation of formaldehyde, urea and biuret is carried out by heating all of these reactants at one time; however, it is possible to achieve condensation in a stepwise manner by first heating the formaldehyde with the biuret, and then continuing the condensation after adding the urea. The amount of catalyst being present in amount ranging from about 0.10 to 0.30%, based on the weight of the reactants, depending upon the activity of the catalyst.

While the condensation is conducted, preferably, at reflux temperatures for from 1 to 5 hours, higher or lower temperatures can, of course, be used, as those skilled in the art will appreciate, with suitable adjustment of reaction time, and pressures.

The neutralization of the medium containing the condensation product can be carried out using any acidic or basic material, and removal of water from the condensation reaction mix to increase the solids content thereof to any desired concentration can be effected by use of any of the well-known procedures and equipment available for this purpose.

The following examples which are presented here for illustrative purposes and which are not to be construed in a limiting sense, show in further detail the manner of practicing our invention.

EXAMPLE I

A solution of 61.8 parts of a urea-biuret mixture composed of about 94% by weight of urea and about 6% by weight of biuret and 190 parts of 37% aqueous formaldehyde containing 0.6 part of sodium hydroxide and 0.3 part of ammonia was heated at reflux for 2 hours. After cooling to room temperature the pH was adjusted to 7.3–7.5 with acetic acid. 55 parts of water were then removed from the resulting solution, in vacuo, the solution temperature being held under 40° C. To this resin solution was added 2 parts of sodium chloroacetate; the resulting resin solution was ready for use as a laminating resin.

EXAMPLE II

A solution of 64.1 parts of a urea-biuret mixture composed of about 86% by weight of urea and about 14% biuret, and 190 parts of 37% formaldehyde containing 0.6 parts of sodium hydroxide and 0.3 part of ammonia, was heated at reflux for two hours. The resulting solution was then treated as set forth in Example I to produce a solution ready for use as a laminating resin.

EXAMPLE III

A mixture of 5.15 parts of biuret and 27.0 parts of urea was dissolved in 80.5 parts of aqueous 37% formaldehyde containing 1 part of ammonia and 0.20 part of sodium hydroxide. The mixture was heated at reflux for two hours and then reduced in volume, in vacuo, to 75% solids. 3 parts of acetic acid was then added and the resulting solution ready for use as a laminating resin.

EXAMPLE IV

An adhesive solution was prepared as in Example III from 12.9 parts of biuret, 22.5 parts of urea, 80.5 parts of 37% formaldehyde, 1 part of ammonia and 0.20 part of sodium hydroxide. The material was then treated as in Example III to provide a laminating resin.

In the evaluation of the laminating resins of this invention, laminated paper panels were prepared from the resin solutions of Examples I and II, and also from resin solutions made by identical procedures except that urea alone instead of a mixture of urea and biuret was used.

Sheets of porous paper were dipped in the resin solutions, the excess solution allowed to drain off, and the sheets air dried to 6–8% volatile content. Laminated panels composed of 10 sheets per panel were produced by subjecting the super-imposed sheets to a pressure of about 1200 p.s.i.g. at temperatures of about 130–140° C. Table I below shows the curing times, temperatures and evaluation of the panels resulting from these comparative tests. The evaluations were carried out by soaking the panels in water for 24 hours at room temperature, and also by immersion of panels in boiling water for fifteen minutes or until the plies separated.

*Table I*

| Sample No. | Resin solution | Curing conditions | | Evaluation | |
|---|---|---|---|---|---|
| | | Temp., ° C. | Time, min. | Soaking for 24 hrs in water, separation | Boiling water |
| 1 | Urea-formaldehyde | 130 | 55 | Complete | Separates in 5 min. |
| 2 | do | 135 | 45 | do | Separates in 4 min. |
| 3 | do | 140 | 45 | do | Separates in 7 min. |
| 4 | From Example I | 130 | 55 | None | Partial separation in 15 min. |
| 5 | do | 140 | 48 | do | No separation in 15 min. |
| 6 | do | 140 | 55 | do | Do. |
| 7 | From Example II | 130 | 55 | do | Partial separation in 15 min. |
| 8 | do | 140 | 45 | do | Partial separation in 12 min. |
| 9 | do | 140 | 55 | do | No separation in 15 min. |

Further tests were carried out using the resin solutions of Examples III and IV as follows:

Panels were prepared from two pieces of wood veneer by spreading the resin solution of Examples III and IV respectively over faces of the panels in a thin uniform layer. Panels were then placed face to face and cured in a heated press at 130° C. for 45 minutes, at a pressure of about 1300 p.s.i.g. Panels which were prepared in the foregoing manner using the resins of Examples III and IV showed no separation upon being soaked in water for 24 hours at room temperature, or in boiling water for 45 minutes. However, panels which were prepared in an identical manner from resin derived from urea and formaldehyde were functionally inferior in that the water resistance and penetration were poorer.

While in the compositions of our invention the urea-biuret ratio may vary to some extent, we have found that resins prepared according to the hereinbefore described method wherein the biuret content of the urea-biuret mixture is from 5 to 20% by weight of the mixture function as particularly excellent laminating resins; resins, similar to the foregoing, but in which the biuret content is in the range of 2 to 5%, or 20 to 35% by weight of the biuret-urea mixture are not as effective as the foregoing in terms of the adhesive bond or water resistance obtainable when the resins are cured, although still an improvement over the urea-formaldehyde resins.

We claim:

1. A process for producing a resinous composition which comprises reacting formaldehyde, urea and biuret, dissolved in an aqueous alkaline medium containing a basic condensation catalyst, the amount of biuret being about 2 to 30% by weight of the total weight of urea and biuret used and the amount of formaldehyde used being such that the molar ratio of the formaldehyde to the

groups of urea and biuret is in the range of about 1.5:1 to 2.4:1.

2. A process for producing a resinous composition which is polymerizable to produce an insoluble infusible resin having improved water resistance and adhesive properties, which comprises reacting formaldehyde, urea and biuret, dissolved in an aqueous medium, in the presence of a basic condensation catalyst to secure a condensation product, the biuret being present in the amount of 2 to 30% by weight of the total weight of urea and biuret and the formaldehyde being present in an amount such that the molar ratio of formaldehyde to

groups is in the range of about 1.5:1 to 2.4:1, and adjusting the pH of the resulting reaction product to about 7.3 to 7.5.

3. A process for producing a resinous condensation product of formaldehyde, biuret and urea which comprises heating, in contact with a basic condensation catalyst, formaldehyde with a mixture of urea and biuret, to secure a condensation product the biuret being present in the amount of 2 to 30% by weight of the total weight of urea and biuret and the formaldehyde being present in an amount such that the molar ratio of formaldehyde to $$(H_2N\overset{O}{\overset{\|}{C}}-)$$

groups is in the range of about 1.5:1 to 2.4:1, the heating being carried out at reflux temperatures at atmospheric pressure for from about 1 to 5 hours.

4. The process for producing a resinous composition which comprises reacting, in contact with a basic condensation catalyst, formaldehyde, urea and biuret dissolved in an aqueous alkaline medium, the biuret being present in the amount of 5 to 20% by weight of the total weight of urea and biuret, and the formaldehyde being present in an amount such that the molar ratio of formaldehyde to

groups is in the range of about 2 to 1.

5. An aqueous solution of a resinous composition formed by condensing formaldehyde with urea and biuret in an aqueous alkaline medium containing a basic condensation catalyst, the biuret being present in the amount of 2 to 30% by weight of the total weight of urea and biuret, and the formaldehyde being present in an amount such that the molar ratio of the formaldehyde to

groups is in the range of about 1.5:1 to 2.4:1.

6. A resinous composition which is convertible to an insoluble and infusible resin having improved water resistance and adhesive properties, comprising the reaction product produced by reacting under condensation conditions formaldehyde, urea and biuret in an aqueous medium containing a basic condensation catalyst, the biuret being present in the amount of 2 to 30% by weight of the total weight of urea, biuret and the formaldehyde being present in an amount such that the molar ratio of the formaldehyde to

groups is in the range of about 1.5:1 to 2.4:1.

References Cited in the file of this patent
UNITED STATES PATENTS

| | | |
|---|---|---|
| 2,244,289 | Cordier | June 3, 1941 |
| 2,693,460 | Gagliardi | Nov. 2, 1954 |